Patented Feb. 16, 1943

2,311,232

UNITED STATES PATENT OFFICE 2,311,232

MANUFACTURE OF CATALYSTS

Vladimir Ipatieff and Herman Pines, Chicago, Ill., assignors to Universal Oil Products Company, Chicago, Ill., a corporation of Delaware No Drawing. Application June 9, 1939, Serial No. 278,326

15 Claims. (Cl. 252—251)

This application is a continuation-in-part of our co-pending application Serial No. 103,391, filed September 30, 1936.

This invention relates particularly to the manufacture of catalysts useful in various types of organic reactions, including those involving different classes of hydrocarbons.

More specifically, the invention is concerned with the manufacture of composite catalysts in which a relatively active ingredient, such as a heavy metal salt, is incorporated into a porous granular and adsorptive carrier so that the catalyst particles produced resist disintegration and agglomeration in various types of vapor, liquid and mixed phase catalytic operations involving organic compounds.

In one specific embodiment, the present invention comprises the manufacture of catalysts for use in organic reactions by impregnating relatively inert granular materials with substantially anhydrous aluminum chloride.

The use of aluminum chloride in organic reactions, and particularly in reactions involving the various groups of hydrocarbons is well known in the art. For the sake of indicating certain types of reaction in which the present prepared catalysts can be employed the following brief summary is given of some typical reactions in which aluminum chloride is employed as a catalyst or condensing agent:

1. Aromatic hydrocarbons can be alkylated with alkyl halides according to the following typical equation:

$$C_6H_6 + CH_3Cl \xrightarrow{AlCl_3} C_6H_5.CH_3 + HCl$$

Benzol   Methyl       Toluene
         chloride

2. In a development of the above reaction an aryl-substituted alkyl halide may be employed as typified by the following equation:

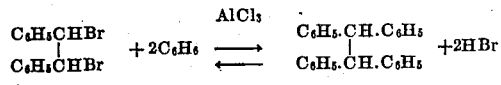

Stilbene bromide  Benzol        Tetraphenyl ethane

3. Using aromatic hydrocarbons and acid chlorides, ketones can be prepared according to the following typical equation:

$$C_6H_6 + CH_3COCl \xrightarrow{AlCl_3} C_6H_5.CO.CH_3 + HCl$$

Benzol Acetyl chloride       Acetophenone

4. The use of aluminum chloride makes possible the preparation of aldehydes by reacting substituted benzenes with carbon monoxide and hydrogen chloride according to the following simple equation:

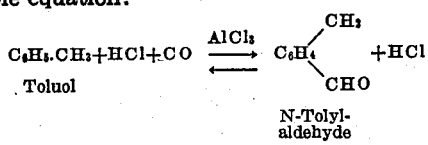

5. Organic acids can be prepared from aromatic hydrocarbons by the action of carbonyl chloride upon the aromatic hydrocarbons as shown below:

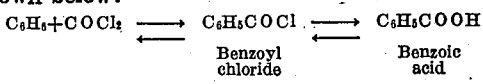

By the development of more complicated reactions corresponding in general to those given in sections 1 and 2, an extensive series of reactions is made possible whereby various types of hydrocarbons may be made to condense and form higher molecular weight products through reactions involving generally a primary halogenation followed by splitting off of the halogen acid and the combination of the resultant radicals. Aluminum chloride is used both as a catalyst in the thermal conversion of relatively heavy petroleum hydrocarbon fractions to produce low boiling gasoline distillates, and also under more moderate conditions of treatment for the purification of these distillates by causing the polymerization of the more reactive aromatic constituents. In the case of complicated hydrocarbon oil mixtures, such as the various fractions produced in the distillation and cracking of petroleum and other hydrocarbon oils it is difficult to follow the exact course of the various reactions which take place when aluminum chloride is employed. However, they may be grouped generally under the terms polymerization, alkylation, and condensation. Aluminum chloride is also serviceable in effecting isomerization reactions, such as for example the isomerization of hexamethylene to methylcyclopentane, and the isomerization of normal paraffin hydrocarbon into isomeric forms.

In effecting various reactions with granular and substantially anhydrous aluminum chloride catalysts there are some difficulties encountered in that the compound tends to sublime at ordinary pressures at a temperature of about 180° C., so that above this point it must be utilized in vapor phase. Furthermore, it is apparent that during the progress of various organic reactions in which the chloride is employed intermediate compounds of a metallo-organic character are formed which frequently possess fluid or semifluid properties which cause a running together of the original particles of catalysts so that less surface is exposed and the reactions are slowed up. Frequently after the use of originally finely divided and granular anhydrous aluminum chloride in such reactions, for example, after the treatment of cracked gasoline, or after the alkylation of aromatic and other types of hydrocarbons with olefins, the catalyst is transformed into a more or less sticky and pasty mass which has greatly diminished catalytic activity and is difficult to treatment for the recovery of the aluminum chloride.

According to the present invention, the above disadvantages are to a large extent overcome by the use of composite granular catalysts, consisting in general of substantially inert porous adsorptive materials impregnated with substantially anhydrous aluminum chloride. Inert granular materials which may be used alternatively but obviously not with exactly equivalent results on account of variations in adsorptive capacity include activated carbons, various silicates and siliceous materials such as fuller's earth, clays, both raw and acid treated, diatomaceous and infusorial earths, granular pumice, and crushed porous porcelain. In fact practically any material which is substantially unreactive with the aluminum chloride so that the desired stable properties of the catalyst granules are assured, may be employed. Of the supports mentioned activated carbons, diatomaceous earths, and pumice are particularly serviceable.

Ordinarily the method of preparation of the present preferred types of catalysts is to mix a granular or powdered adsorbent with anhydrous aluminum chloride and then heat the mass under elevated temperatures and pressures until the chloride has been adsorbed into the pores of the adsorbent. The proportions of adsorbent carrier and aluminum chloride may be varied as desired to make catalyst composites of varying activity. In the case of properly activated granular carbons or chars, it has been found possible and practical to make stable catalysts resistant to disintegrating influences by using approximately equal parts by weight of adsorbent carbon and anhydrous aluminum chloride. Such proportions, after thorough mechanical mixing, are placed in a pressure vessel, which is preferably lined with glass, a small amount of hydrogen chloride is added, the vessel is brought up to a pressure of approximately 25 atmospheres by the introduction of hydrogen and heated at a temperature of approximately 250° C. for several hours. After such a treatment of the original mix the product obtained is dry and granular, the aluminum chloride apparently having disappeared, though it is actually present in the pores and on the surface of the carbon as evidenced by the violent reaction of the granules with water and the catalytic activity in organic reactions. Other analogous catalyst composites may be made by employing substantially the same procedure in connection with other porous adsorbents. Obviously the amount of aluminum chloride used will depend upon the adsorptive capacity of the material employed and similarly the temperature and pressure employed during the impregnation may be varied to produce the best results in any given instance.

Catalysts of the present character may be employed in liquid phase organic reactions with substantially no tendency for the original particles to run together due to the formation of intermediate sludge-like products, so that much larger quantities of material may be treated before the catalyst has lost its activity. Another advantage resides in the fact that the adsorbed aluminum chloride will remain in place without volatilization at considerably higher temperatures than its normal sublimation point, when vapors of reacting compounds are passed over a stationary granular bed of catalyst. This permits the utilization of the catalysts in the vapor phase treatment of gasoline boiling range cracked distillates for their refining, either as they are produced at the cracking plant or from rerun stills. As an explanation of the observed fact that catalysts of the present character maintain their activity over considerably longer periods than ordinary granular anhydrous aluminum chloride, it is probable that the intermediate addition products and heavy carbonaceous by-products are adsorbed by the activated carbon up to their point of saturation so that the particles remain discrete and show a minimum tendency to adhere over unusually long periods of service.

The term "activated carbon" as used in the present specification, is intended to include any type of prepared carbon or carbonaceous material which is more or less granular and possessed of good porosity and structural strength and which has been prepared by general steps involving the removal of adsorbed materials from granular carbonaceous materials such as cocoanut char, wood char, and various varieties of coke by mineral acids and by the controlled heating, preferably under vacuum, to expel adsorbed liquids and gases. It is recognized that various forms of active granular chars will vary considerably in adsorptive capacity so that therefore the properties of catalysts prepared in accordance with the present invention will vary both in respect to the amount of anhydrous metal halides which they are able to absorb and in respect to the periods of service in which they are able to maintain a practical activity in different organic reactions.

The granular catalysts may also be readily utilized in the polymerization of normally gaseous olefins such as those present in the hydrocarbon gas mixtures produced incidental to the cracking of heavy hydrocarbon oils to produce light motor fuel.

While the present process is particularly applicable to the impregnation of relatively inert porous adsorbents with aluminum chloride, it is found utilizable in connection with other types of catalysts which function similarly to aluminum chloride such as, for example, zirconium chloride, ferric chloride, and others. When using these materials, the proportions of carrier and active catalyst will obviously be varied to produce optimum results.

As specific examples of the manufacture of catalyst comprised within the scope of the present invention, the following are given although not with the intention of limiting its scope in exact correspondence therewith.

*Example I*

100 parts by weight of an activated carbon and 100 parts by weight of anhydrous aluminum chloride were thoroughly mixed in a dry atmosphere and then placed in a pressure vessel lined with glass to avoid corrosion. An amount of hydrogen chloride gas was introduced equal to 5% by weight of the total mix and the pressure was then raised to a total of 25 atmospheres by the introduction of substantially dry hydrogen. The vessel was heated to a temperature of 250° C. and the contents mechanically agitated for a period of three hours. The product had the general appearance of granular carbon but was somewhat more gray than black. The particles were entirely homogeneous in appearance and gave a vigorous evolution of heat when contacted with water.

The above catalyst was used to isomerize n-butane. The vapors of this hydrocarbon containing about 2% by weight of hydrogen chloride were passed through a granular mass of the catalyst at a temperature of about 200° C., a pressure of 650 lbs. per square inch and a moderate space velocity. It was found that the exit gases contained 53% of isobutane, 3% of propane, 8% of hydrocarbons of more than 5 carbon atoms to the molecule, and the balance unchanged n-butane. Compared with an equivalent weight of ordinary granular anhydrous aluminum chloride, the prepared catalyst could be used approximately four times as long before the gradual deposition of carbonaceous residues and by-products rendered the action of the adsorbed aluminum chloride ineffective.

The catalyst prepared as described above was also utilized in a cracking plant operating upon a gas oil produced from a Mid-Continent crude and having a gravity of 33° A. P. I. The vapors of the gas oil were preheated to a temperature of 400° C. and passed over a catalyst before entering separating and fractionating equipment. Approximately the same yield of 400° E. P. gasoline was obtained as in ordinary pressure cracking without catalyst, that is, 65% by volume of the charging stock, and in addition the product required substantially no treatment as produced other than stabilizing to the proper vapor pressure.

As an example of the use of the composite aluminum chloride catalyst to polymerize normally gaseous olefins, a stabilizer reflux from a cracking plant which contained approximately 30% of higher olefins, including propylene and the butenes, was passed over the granular catalyst at a temperature of 85° C., and there was produced by this operation approximately eight gallons of liquid polymer per 1000 cubic feed of the entering gas mixture. The liquid products comprising the polymers and adsorbed low boiling paraffins boiled within the range of 40° to 205° C. and were suitable in all respects for use as motor fuel in internal combustion engines.

The catalyst was also utilizable in alkylation reactions, and as an example the compound isobutane was alkylated by isobutene at a temperature of approximately −20° C. in the presence of about 30% by weight of a granular composite material which was maintained in suspension in the isobutane by mechanical agitation while a stream of isobutene containing a small percentage of hydrogen chloride was gradually introduced. The introduction of the olefin was continued until approximately equal parts by weight of paraffin and olefin had reacted, when the process was stopped and the liquid alkylated products decanted and recovered. This operation was repeated approximately ten times before the gradual deterioration of the catalyst rendered it ineffective from a practical standpoint. A similar result was obtained when a mixture of the isobutane and isobutene was pumped over a bed of the granular catalyst under controlled temperature conditions.

*Example II*

71 parts by weight of diatomaceous earth was mixed with 29 parts by weight of anhydrous aluminum chloride, and placed in a pressure vessel lined with glass to avoid corrosion. 4% by weight of hydrogen chloride gas was introduced and the contents of the vessel were placed under a pressure of 25 atmospheres by the introduction of dry hydrogen. After heating the vessel for a period of three hours at a temperature of approximately 250° C. during agitation, it was found that the aluminum chloride was exactly adsorbed on the diatomaceous earth so that an apparently dry material was formed.

The above prepared catalyst was used in isomerization, cracking, and various other types of hydrocarbon conversion reactions, and functioned in substantially the same manner as the catalyst of Example I although somewhat larger amounts were required to compensate for the smaller percentage of aluminum chloride.

*Example III*

70 parts by weight of pumice was mixed with 32 parts of substantially anhydrous aluminum chloride and heated in a pressure vessel at 250° C. under 25 atmospheres of hydrogen pressure in the presence of 4–5% by weight of hydrogen chloride gas as in the two preceding examples. The particles were dry and could be utilized in substantially the same types of reactions as the catalysts of Example II.

*Example IV*

82 parts by weight of granular porous porcelain sized to approximately 10–20 mesh were heated with 18 parts by weight of aluminum chloride at a temperature of 260° C. under a hydrogen pressure of 30 atmospheres in the presence of 4% by weight of hydrogen chloride gas. After 4 hours heating the particles of the porcelain were dry and were tried in the various types of conversion reactions in the same general manner as outlined in Example I, with results in proportion to the amount of aluminum chloride present.

We claim as our invention:

1. A process for the manufacture of catalysts suitable for accelerating reactions among organic compounds, which comprises impregnating a solid adsorbent with anhydrous aluminum chloride under superatmospheric pressure and while the adsorbent is at a temperature above the vaporization point of the aluminum chloride.

2. A method for producing a catalyst for accelerating reactions among organic compounds which comprises impregnating a solid adsorbent with a readily volatilizable anhydrous catalytic metallic halide while the adsorbent is at a temperature above the vaporization point of the halide and under superatmospheric pressure.

3. The process as defined in claim 1 further characterized in that the adsorbent is impregnated with the aluminum chloride in the presence of hydrogen chloride.

4. The process as defined in claim 1 further characterized in that the adsorbent is impregnated with the aluminum chloride in the presence of hydrogen.

5. The process as defined in claim 1 further characterized in that the adsorbent is impregnated with the aluminum chloride in the presence of hydrogen chloride and hydrogen.

6. The process as defined in claim 2 further characterized in that the adsorbent is impregnated with the metallic halide in the presence of hydrogen chloride.

7. The process as defined in claim 2 further characterized in that the adsorbent is impregnated with the metallic halide in the presence of hydrogen.

8. The process as defined in claim 2 further characterized in that the adsorbent is impregnated with the metallic halide in the presence of hydrogen chloride and hydrogen.

9. A process for the manufacture of catalysts suitable for accelerating reactions among organic compounds, which comprises impregnating a solid adsorbent with anhydrous aluminum chloride while the adsorbent is at a temperature above the vaporization point of said aluminum chloride and under super-atmospheric pressure, said impregnation being effected in an atmosphere substantially free of hydrocarbons.

10. A method for producing a catalyst for accelerating reactions among organic compounds which comprises impregnating a solid adsorbent with a readily volatilizable anhydrous catalytic metallic halide while the adsorbent is at a temperature above the vaporization point of the halide and under superatmospheric pressure, said impregnation being effected in an atmosphere substantially free of hydrocarbons.

11. A process for the manufacture of catalysts suitable for accelerating reactions among organic compounds, which comprises impregnating a granular adsorbent with a metal halide selected from the group consisting of aluminum chloride, zirconium chloride, and ferric chloride while the adsorbent is at a temperature above the vaporization point of said metal halide and under superatmospheric pressure, said impregnation being effected in an atmosphere substantially free of hydrocarbons.

12. A process for the manufacture of catalysts suitable for accelerating reactions among organic compounds, which comprises impregnating a granular adsorbent with vapors of a metal halide selected from the group consisting of aluminum chloride, zirconium chloride, and ferric chloride while the adsorbent is at temperature above 200° C. and under superatmospheric pressure of the order of 25 atmospheres, said impregnation being effected in an atmosphere substantially free of hydrocarbons.

13. A process for the manufacture of catalysts suitable for accelerating reactions among organic compounds, which comprises impregnating a granular adsorbent with vapors of aluminum chloride while the adsorbent is at temperature above 200° C. and under superatmospheric pressure of the order of 25 atmospheres, said impregnation being effected in an atmosphere substantially free of hydrocarbons.

14. A process for the manufacture of catalysts suitable for accelerating reactions among organic compounds which comprises impregnating a granular activated carbon with anhydrous aluminum chloride while the activated carbon is at a temperature above vaporization point of said aluminum chloride and under superatmospheric pressure, said impregnation being effected in an atmosphere substantially free of hydrocarbons.

15. A process for the manufacture of catalysts suitable for accelerating reactions among organic compounds, which comprises impregnating a granular activated carbon with vapors of anhydrous aluminum chloride while the activated carbon is at temperature above 200° C. and under superatmospheric pressures of the order of 25 atmospheres, said impregnation being effected in an atmosphere substantially free of hydrocarbons.

VLADIMIR IPATIEFF.
HERMAN PINES.